(12) United States Patent
Sakamoto et al.

(10) Patent No.: US 10,892,659 B2
(45) Date of Patent: Jan. 12, 2021

(54) STATOR UNIT, ROTARY ELECTRIC MACHINE INCLUDING STATOR UNIT, AND METHOD OF MANUFACTURING STATOR UNIT

(71) Applicant: TOP Co., Ltd., Echizen (JP)

(72) Inventors: Suguru Sakamoto, Kanagawa (JP); Yoshiteru Kurokawa, Kanagawa (JP); Junya Okabe, Akita (JP); Hiroyuki Miyoshi, Fukui (JP); Yoshihiro Kodera, Fukui (JP)

(73) Assignee: TOP CO., LTD., Echizen (JP)

( * ) Notice: Subject to any disclaimer, the term of this patent is extended or adjusted under 35 U.S.C. 154(b) by 232 days.

(21) Appl. No.: 15/316,718

(22) PCT Filed: Jun. 26, 2015

(86) PCT No.: PCT/JP2015/068479
§ 371 (c)(1),
(2) Date: Dec. 6, 2016

(87) PCT Pub. No.: WO2016/006475
PCT Pub. Date: Jan. 14, 2016

(65) Prior Publication Data
US 2017/0149299 A1    May 25, 2017

(30) Foreign Application Priority Data

Jul. 8, 2014  (JP) .................................. 2014-140720
Apr. 23, 2015  (JP) .................................. 2015-088604

(51) Int. Cl.
*H02K 3/38*  (2006.01)
*H02K 15/08*  (2006.01)
(Continued)

(52) U.S. Cl.
CPC ............... *H02K 3/38* (2013.01); *H02K 3/522* (2013.01); *H02K 15/0056* (2013.01);
(Continued)

(58) Field of Classification Search
CPC ............ H02K 3/38; H02K 3/522; H02K 5/22; H02K 5/225; H02K 15/0056;
(Continued)

(56) References Cited

U.S. PATENT DOCUMENTS 9,337,694 B2 *  5/2016  Egami .................... H02K 3/522
2004/0207283 A1 *  10/2004  Oohashi ................. H02K 3/12
310/207
(Continued)

FOREIGN PATENT DOCUMENTS

JP    2009-038863 A    2/2009
JP    2009-303420 A    12/2009
(Continued)

*Primary Examiner* — Shawki S Ismail
*Assistant Examiner* — Monica Mata
(74) *Attorney, Agent, or Firm* — Rabin & Berdo, P.C.

(57) ABSTRACT

A stator unit for including a plurality of coils includes a stator core configured to have the coils wound around the stator core; and a routing member including a plurality of groove configured to have wires routed in the groove, the wires extending from the coils.

10 Claims, 11 Drawing Sheets

(51) Int. Cl.
  *H02K 15/00* (2006.01)
  *H02K 3/52* (2006.01)
  *H02K 15/085* (2006.01)

(52) U.S. Cl.
  CPC ......... *H02K 15/0068* (2013.01); *H02K 15/08* (2013.01); *H02K 15/085* (2013.01); *H02K 2203/06* (2013.01)

(58) Field of Classification Search
  CPC .. H02K 15/0075; H02K 15/08; H02K 15/085; H02K 2203/06
  USPC .......................................................... 310/71
  See application file for complete search history.

(56) References Cited

U.S. PATENT DOCUMENTS

| | | | |
|---|---|---|---|
| 2009/0309452 A1 | 12/2009 | Tao et al. | |
| 2010/0201213 A1* | 8/2010 | Kataoka | H02K 3/522 |
| | | | 310/71 |
| 2012/0005881 A1 | 1/2012 | Tao et al. | |
| 2014/0070646 A1* | 3/2014 | Isoda | H02K 3/325 |
| | | | 310/71 |
| 2015/0061430 A1* | 3/2015 | Egami | H02K 15/0056 |
| | | | 310/71 |

FOREIGN PATENT DOCUMENTS

| | | |
|---|---|---|
| JP | 2012-222970 A | 11/2012 |
| JP | 2014-187797 A | 10/2014 |

\* cited by examiner

STATOR UNIT, ROTARY ELECTRIC MACHINE INCLUDING STATOR UNIT, AND METHOD OF MANUFACTURING STATOR UNIT

TECHNICAL FIELD

The present invention relates to a stator unit around which coils are wound, a rotary electric machine including the stator unit, and a method of manufacturing the stator unit.

BACKGROUND ART

JP 2009-303420A discloses a stator unit around which a plurality of coils are wound. In this stator unit, the ends of wires pulled out from the coils are connected as appropriate.

SUMMARY OF INVENTION

As disclosed in JP 2009-303420A, when connecting the ends of the wires pulled out from the coils, the wires may get tangled and misconnected. This could lower the manufacturing efficiency of the stator unit.

The present invention has an object to increase the manufacturing efficiency of a stator unit.

According to one aspect of the present invention, a stator unit for including a plurality of coils includes a stator core configured to have the coils wound around the stator core; and a routing member including a plurality of groove portions configured to have wires routed in the groove portions, the wires extending from the coils.

According to another aspect of the present invention, a method of manufacturing a stator unit includes winding a plurality of wires around a stator core to form a plurality of coils; pulling out ends of the wires of the coils;

mounting a routing member configured to have the wires pulled out from the coils routed therein; and routing the wires pulled out from the coils in groove portions formed in the routing member.

DESCRIPTION OF EMBODIMENTS

The following describes an embodiment of the present invention with reference to the attached drawings.

Figure 1:
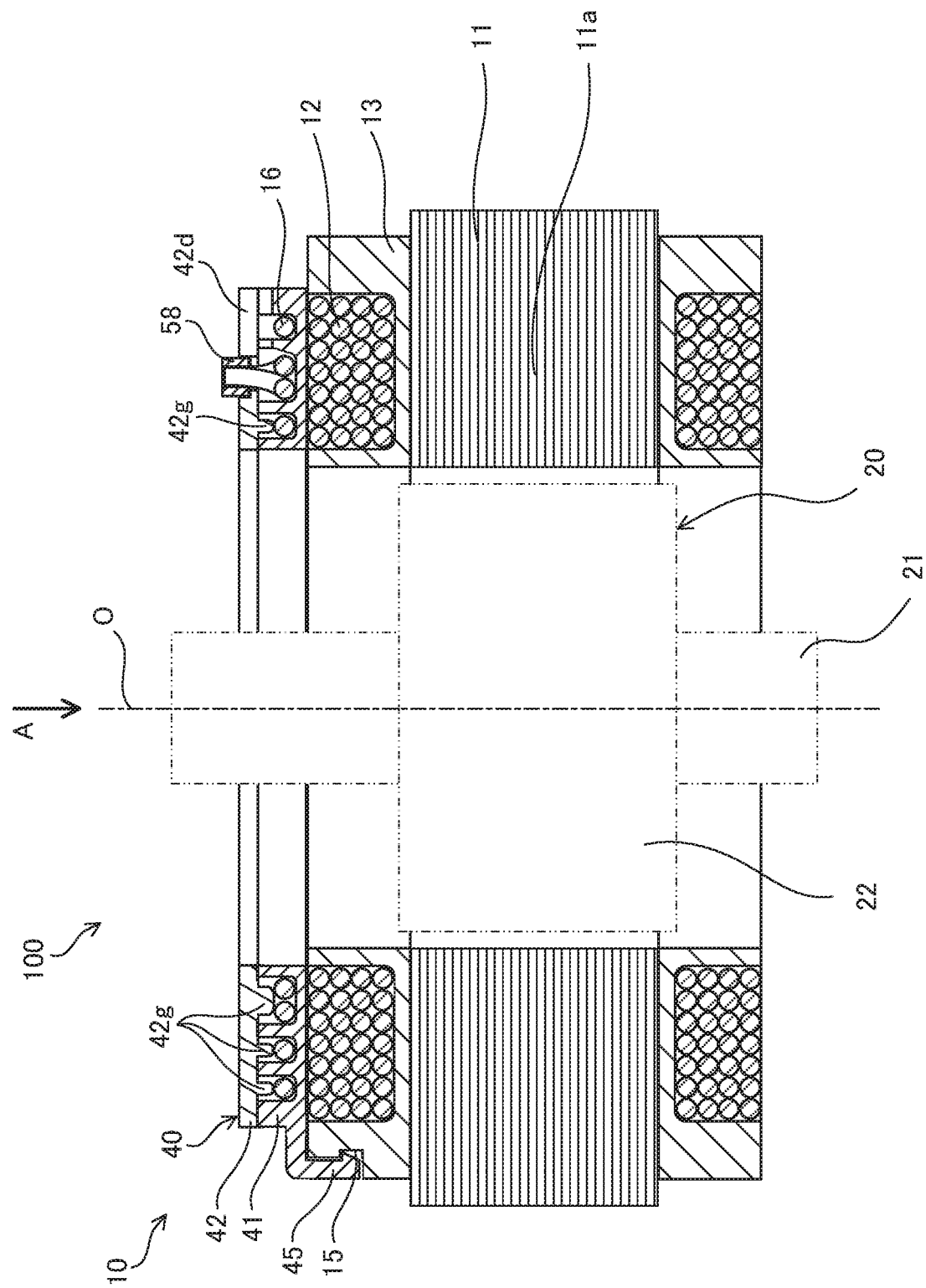
FIG. 1 is a cross-sectional view of a stator unit according to an embodiment of the present invention.

As shown in FIG. 1, a rotary electric machine 100 is a three-phase alternating-current motor including a stator unit 10 and a rotor 20 that is disposed at the inner side of the stator unit 10.

The rotor 20 includes a rotor shaft 21 that is rotatably supported by a non-illustrated casing, and a permanent magnet 22 that is mounted on the rotor shaft 21.

The stator unit 10 includes a stator core 11, coils 12, an insulator 13, and a routing member 40. The stator core 11 includes teeth 11a. The coils 12 are mounted on the teeth 11a of the stator core 11. The insulator 13 is made of insulating resin and interposed between the teeth 11a and the coils 12. The routing member 40 and the coils 12 are lined up in an axial direction. Note that the "axial direction" denotes a direction in which a central axis O of the stator unit 10 extends.

The stator core 11 is made of a magnetic material and formed by layering a plurality of steel plates. The plurality of teeth 11a extending toward the central axis O are formed at the inner side of the stator core 11 in a radial direction.

Figure 2:
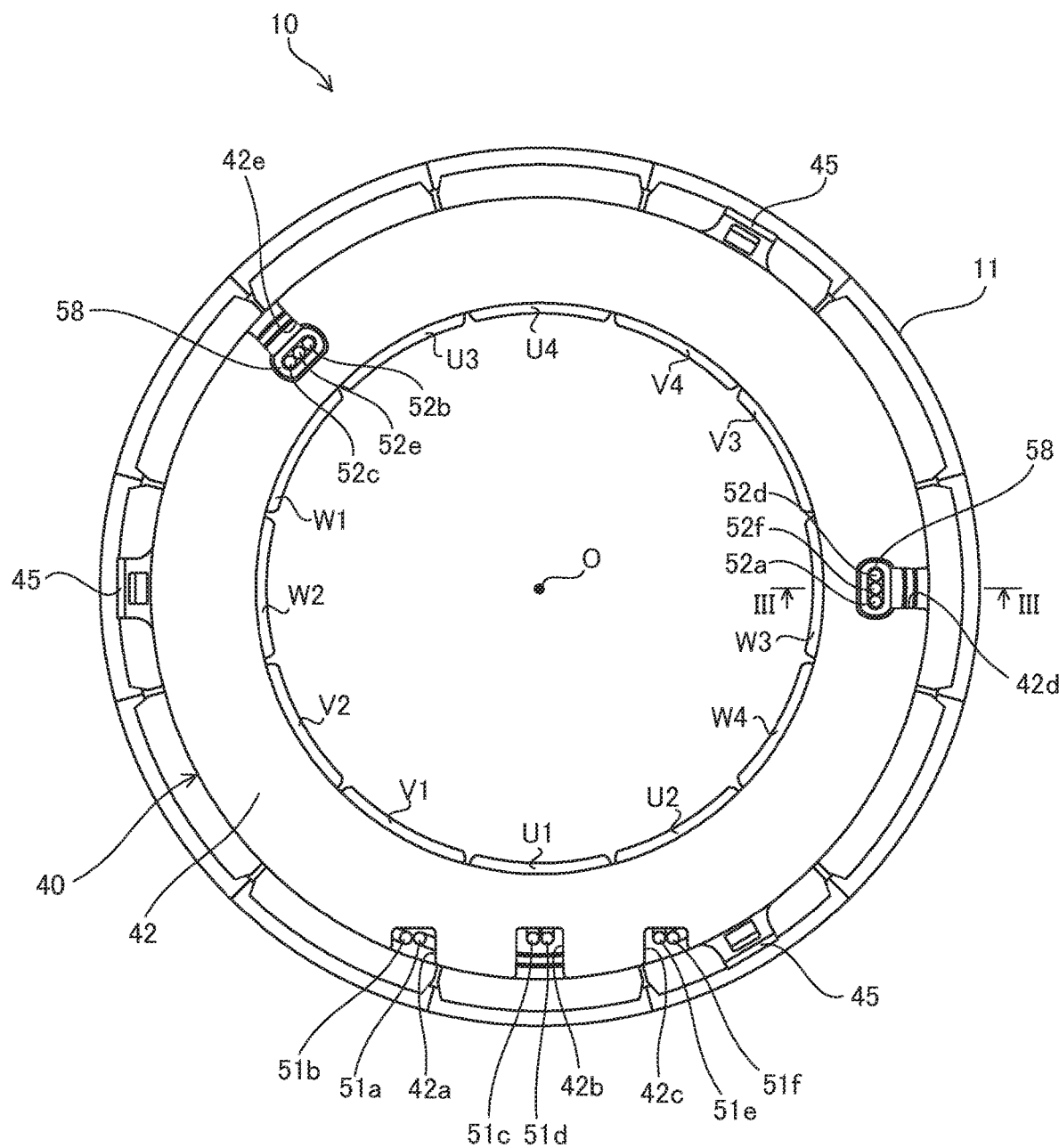
FIG. 2 shows the stator unit as viewed in a direction of arrow A of FIG. 1.

The coils 12 are formed by winding wires 16 made of a conductive metal, such as copper, around the teeth 11a via the insulator 13. As shown in FIG. 2, U-phase coils U1 to U4, V-phase coils V1 to V4, and W-phase coils W1 to W4 are provided as the coils 12 according to the present embodiment in correspondence with three-phase driving currents.

Four coils are provided each phase, of which two coils are adjacently arranged to oppose, via the central axis O, the remaining two coils that are adjacently arranged. Specifically, a first U-phase coil U1 and a second U-phase coil U2 shown in a lower part of FIG. 2 are arranged to oppose, via the central axis O, a third U-phase coil U3 and a fourth U-phase coil U4. Similarly, V-phase coils V1 to V4, as well as W-phase coils W1 to W4, are symmetrically arranged. In the present embodiment, the coils U1 to U4, V1 to V4, W1 to W4 are arranged in the following order in a clockwise direction: the first U-phase coil U1 shown in the lower part of FIG. 2 is followed by the first V-phase coil V1, the second V-phase coil V2, the second W-phase coil W2, the first W-phase coil W1, the third U-phase coil U3, the fourth U-phase coil U4, the fourth V-phase coil V4, the third V-phase coil V3, the third W-phase coil W3, the fourth W-phase coil W4, and the second U-phase coil U2.

Figure 4:
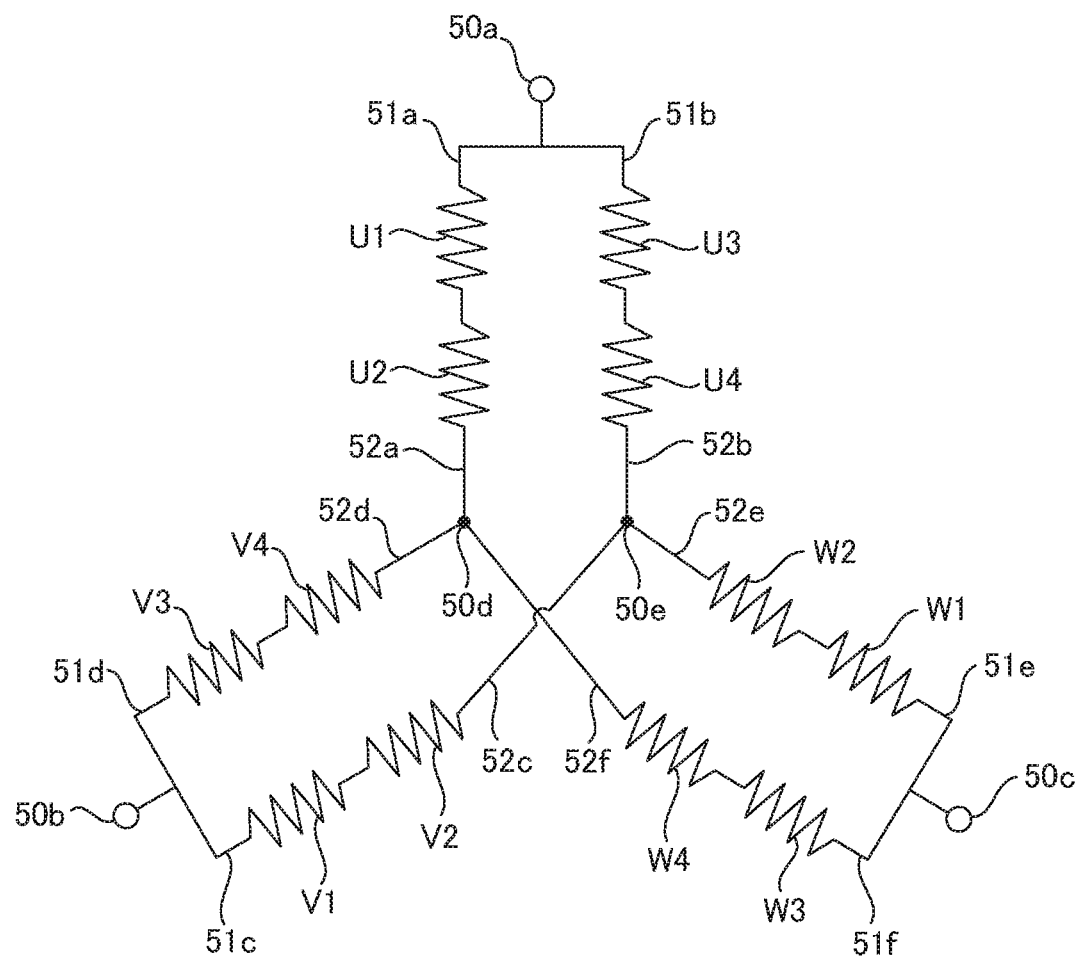
FIG. 4 shows an equivalent electric circuit of the stator.

A description is now given of wire connection between the coils with reference to an equivalent electric circuit diagram of FIG. 4.

One wire 16 is used to form two adjacently-arranged coils, e.g., the first U-phase coil U1 and the second U-phase coil U2. A winding start portion and a winding end portion of the wire 16 are pulled out from the coils U1, U2. The wire 16 that has been pulled out is connected to a wire(s) 16 pulled out from another coil(s). As shown in FIG. 4, a winding start portion of the wire 16 that forms the first U-phase coil U1 and the second U-phase coil U2 is pulled out as a first U-phase power wire 51a from the first U-phase coil U1. Similarly, a winding start portion of the wire 16 that forms the third U-phase coil U3 and the fourth U-phase coil U4 is pulled out as a second U-phase power wire 51b from the third U-phase coil U3. The first U-phase power wire 51a and the second U-phase power wire 51b are connected by a U-phase terminal 50a, and receive electric power supplied from a non-illustrated power source.

A winding start portion of the wire 16 that forms the first V-phase coil V1 and the second V-phase coil V2 is pulled out as a first V-phase power wire 51c from the first V-phase coil V1. Similarly, a winding start portion of the wire 16 that forms the third V-phase coil V3 and the fourth V-phase coil V4 is pulled out as a second V-phase power wire 51d from the third V-phase coil V3. The first V-phase power wire 51c and the second V-phase power wire 51d are connected by a V-phase terminal 50b, and receive electric power supplied from a non-illustrated power source.

A winding start portion of the wire 16 that forms the first W-phase coil W1 and the second W-phase coil W2 is pulled out as a first W-phase power wire 51e from the first W-phase coil W1. Similarly, a winding start portion of the wire 16 that forms the third W-phase coil W3 and the fourth W-phase coil W4 is pulled out as a second W-phase power wire 51f from the third W-phase coil W3. The first W-phase power wire 51e and the second W-phase power wire 51f are connected by a W-phase terminal 50c, and receive electric power supplied from a non-illustrated power source.

On the other hand, a winding end portion of the wire 16 that forms the first U-phase coil U1 and the second U-phase coil U2 is pulled out as a first U-phase neutral wire 52a from the second U-phase coil U2. Similarly, a winding end portion of the wire 16 that forms the third U-phase coil U3 and the fourth U-phase coil U4 is pulled out as a second U-phase neutral wire 52b from the fourth U-phase coil U4. A winding end portion of the wire 16 that forms the first V-phase coil V1 and the second V-phase coil V2 is pulled out as a first V-phase neutral wire 52c from the second V-phase coil V2. A winding end portion of the wire 16 that forms the third V-phase coil V3 and the fourth V-phase coil V4 is pulled out as a second V-phase neutral wire 52d from the fourth V-phase coil V4. A winding end portion of the wire 16 that forms the first W-phase coil W1 and the second W-phase coil W2 is pulled out as a first W-phase neutral wire 52e from the second W-phase coil W2. A winding end portion of the wire 16 that forms the third W-phase coil W3 and the fourth W-phase coil W4 is pulled out as a second W-phase neutral wire 52f from the fourth W-phase coil W4. The first U-phase neutral wire 52a, the second V-phase neutral wire 52d, and the second W-phase neutral wire 52f are connected at a first neutral point 50d. The second U-phase neutral wire 52b, the first V-phase neutral wire 52c, and the first W-phase neutral wire 52e are connected at a second neutral point 50e. The power wires 51a to 51f and the neutral wires 52a to 52f pulled out from the coils are routed in the routing member 40.

As shown in FIG. 1, the insulator 13 is formed to cover the teeth 11a of the stator core 11. A plurality of latching portions 15 for fixing the routing member 40 in place are formed in an outer circumference of the insulator 13. Later-described positioning portions 45 of the routing member 40 latch with the latching portions 15.

Figure 5:
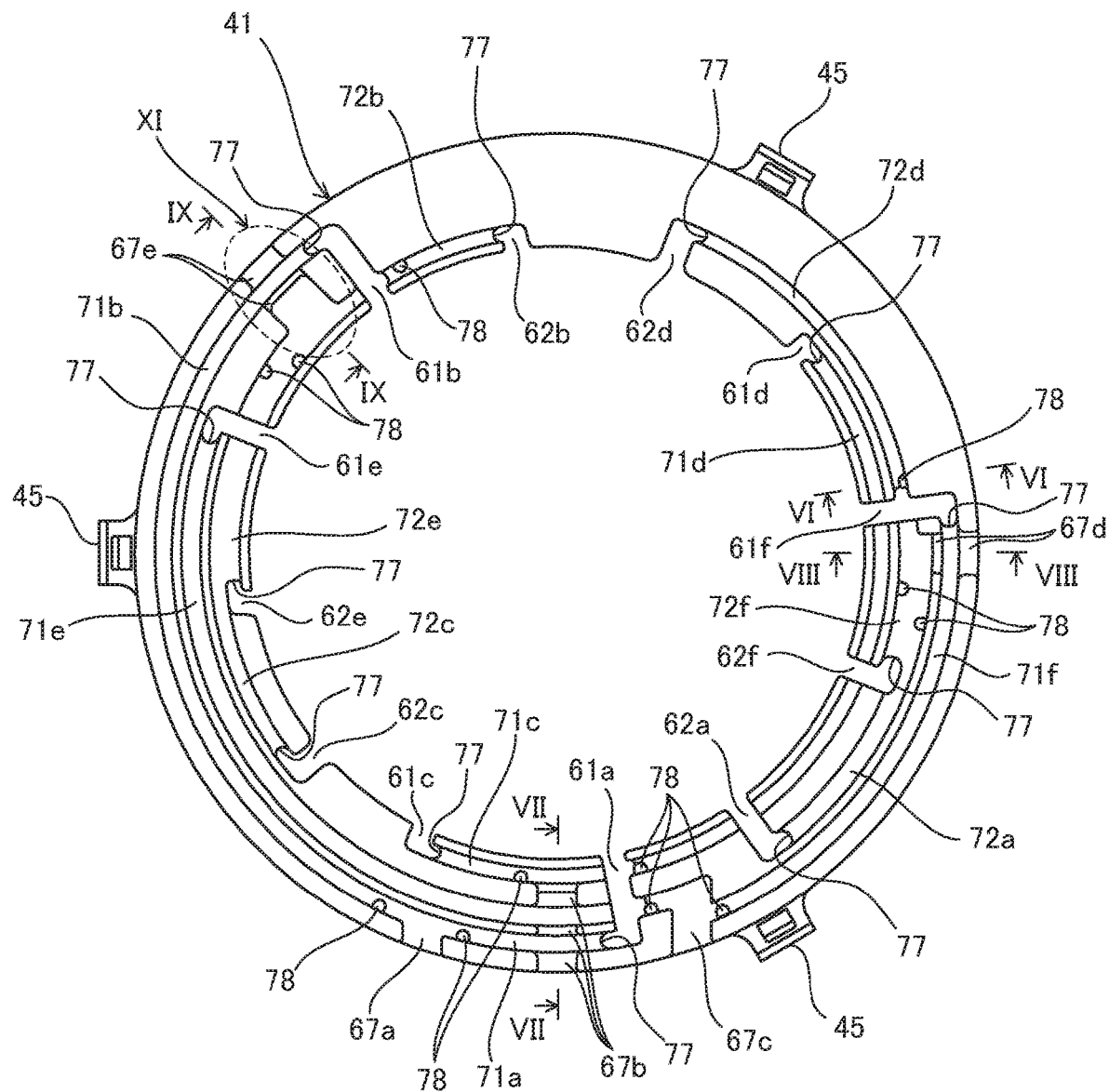
FIG. 5 shows a routing member of the stator unit according to the embodiment of the present invention.

The routing member 40 includes a main body 41 and a cover 42. As shown in FIG. 5, a plurality of grooves 71a to 71f, 72a to 72f are formed in the main body 41 as groove portions in which the wires 16 are fit. The cover 42 is fixed to the main body 41 so as to cover the grooves 71a to 71f, 72a to 72f of the main body 41.

Figure 6:
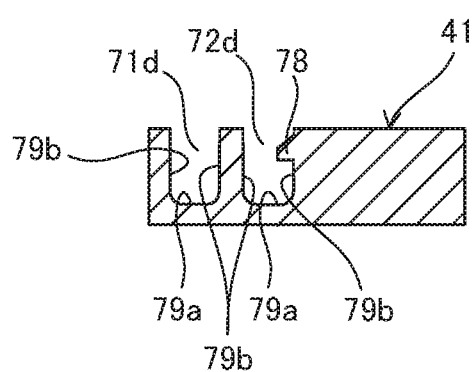
FIG. 6 is a cross-sectional view taken along the line VI-VI of FIG. 5.
Figure 7:
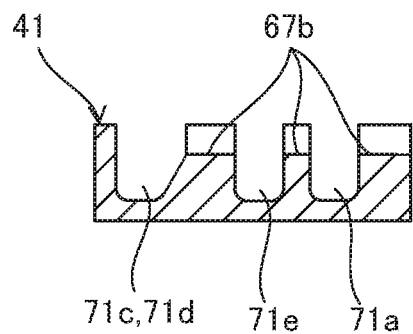
FIG. 7 is a cross-sectional view taken along the line VII-VII of FIG. 5.
Figure 8:
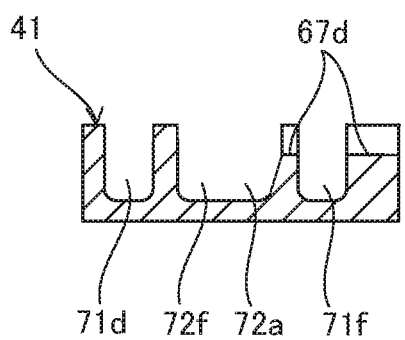
FIG. 8 is a cross-sectional view taken along the line VIII-VIII of FIG. 5.
Figure 9:
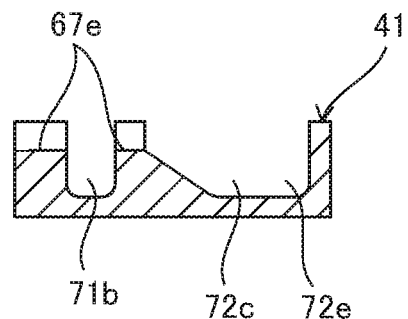
FIG. 9 is a cross-sectional view taken along the line IX-IX of FIG. 5.

The main body 41 of the routing member 40 will now be described with reference to FIGS. 5 to 9. FIG. 5 shows only the main body 41 as viewed in a direction of arrow A of FIG. 1. FIG. 6 is a cross-sectional view taken along the line VI-VI of FIG. 5. FIG. 7 is a cross-sectional view taken along the line VII-VII of FIG. 5. FIG. 8 is a cross-sectional view taken along the line VIII-VIII of FIG. 5. FIG. 9 is a cross-sectional view taken along the line IX-IX of FIG. 5.

The main body 41 is a circular ring member made of resin, and includes the plurality of grooves 71a to 71f, 72a to 72f, guide slits 61a to 61f, 62a to 62f, collection grooves 67a to 67e, and the positioning portions 45. The wires 16 pulled out from the coils U1 to U4, V1 to V4, W1 to W4 are fit in the grooves 71a to 71f, 72a to 72f. The guide slits 61a to 61f, 62a to 62f guide the wires 16 pulled out from the coils U1 to U4, V1 to V4, W1 to W4 to the grooves 71a to 71f, 72a to 72f. The collection grooves 67a to 67e serve as collection groove portions in which the ends of the wires 16 that have been fit in the grooves 71a to 71f, 72a to 72f are collected. The positioning portions 45 are formed to project from an outer circumference of the main body 41, and latch with the insulator 13.

The grooves 71a to 71f, 72a to 72f guide the wires 16 that have been pulled out from the coils U1 to U4, V1 to V4, W1 to W4 to the positions where the wires 16 are connected. The grooves 71a to 71f, 72a to 72f are joined to the guide slits 61a to 61f, 62a to 62f at one end, and joined to the collection grooves 67a to 67e at the other end.

The grooves 71a to 71f, 72a to 72f are categorized as either power wire grooves 71a to 71f in which the power wires 51a to 51f are fit, or neutral wire grooves 72a to 72f in which the neutral wires 52a to 52f are fit.

The power wire grooves 71a to 71f include: a first U-phase power wire groove 71a in which the first U-phase power wire 51a pulled out from the first U-phase coil U1 is fit; a second U-phase power wire groove 71b in which the second U-phase power wire 51b pulled out from the third U-phase coil U3 is fit; a first V-phase power wire groove 71c in which the first V-phase power wire 51c pulled out from the first V-phase coil V1 is fit; a second V-phase power wire groove 71d in which the second V-phase power wire 51d pulled out from the third V-phase coil V3 is fit; a first W-phase power wire groove 71e in which the first W-phase power wire 51e pulled out from the first W-phase coil W1 is fit; and a second W-phase power wire groove 71f in which the second W-phase power wire 51f pulled out from the third W-phase coil W3 is fit.

The neutral wire grooves 72a to 72f include: a first U-phase neutral wire groove 72a in which the first U-phase neutral wire 52a pulled out from the second U-phase coil U2 is fit; a second U-phase neutral wire groove 72b in which the second U-phase neutral wire 52b pulled out from the fourth U-phase coil U4 is fit; a first V-phase neutral wire groove 72c in which the first V-phase neutral wire 52c pulled out from the second V-phase coil V2 is fit; a second V-phase neutral wire groove 72d in which the second V-phase neutral wire 52d pulled out from the fourth V-phase coil V4 is fit; a first W-phase neutral wire groove 72e in which the first W-phase neutral wire 52e pulled out from the second W-phase coil W2 is fit; and a second W-phase neutral wire groove 72f in which the second W-phase neutral wire 52f pulled out from the fourth W-phase coil W4 is fit.

The grooves 71a to 71f, 72a to 72f are separated from one another in a radial direction of the main body 41. The first U-phase power wire groove 71a in which the first U-phase power wire 51a is fit, the second U-phase power wire groove 71b in which the second U-phase power wire 51b is fit, and the second W-phase power wire groove 71f in which the second W-phase power wire 51f is fit are located outermost in the radial direction of the main body 41. The first W-phase power wire groove 71e in which the first W-phase power wire 51e is fit, the first U-phase neutral wire groove 72a in which the first U-phase neutral wire 52a is fit, the second V-phase neutral wire groove 72d in which the second V-phase neutral wire 52d is fit, and the second W-phase neutral wire groove 72f in which the second W-phase neutral wire 52f is fit are located at the inner side of the foregoing grooves 71a, 71b, 71f. The first V-phase power wire groove 71c in which the first V-phase power wire 51c is fit, the second V-phase power wire groove 71d in which the second V-phase power wire 51d is fit, the second U-phase neutral wire groove 72b in which the second U-phase neutral wire 52b is fit, the first V-phase neutral wire groove 72c in which the first V-phase neutral wire 52c is fit, and the first W-phase neutral wire groove 72e in which the first W-phase neutral wire 52e is fit are located innermost in the radial direction of the main body 41. Especially, the power wire grooves 71a to 71f in which the power wires 51a to 51f are fit are separated from other grooves in the radial and circumferential directions to prevent contact between the power wires 51a to 51f and other wires 16.

As shown in FIG. 6, each of the grooves 71a to 71f, 72a to 72f has a U-shaped cross-section, and includes a bottom surface 79a and side surfaces 79b that axially rise from the bottom surface 79a. Holding protrusions 78 for holding the wires 16 inside the grooves are provided at arbitrary positions on the side surfaces 79b. Especially, it is preferable to provide the holding protrusions 78 in the vicinity of junctions with the collection grooves 67a to 67e. The holding protrusions 78 can prevent the wires 16 from coming off the grooves 71a to 71f, 72a to 72f when the direction of the wires 16 changes from the circumferential direction to the radial direction upon transition from the grooves 71a to 71f, 72a to 72f to the collection grooves 67a to 67e.

The guide slits 61a to 61f, 62a to 62f are cutouts that are formed to penetrate through the main body 41 in the axial direction. Each of the guide slits 61a to 61f, 62a to 62f is located at a portion adjacent to an axial direction of a corresponding one of the coils U1 to U4, V1 to V4, W1 to W4. In the present embodiment, the guide slits 61a to 61f, 62a to 62f radially extend from an inner circumference of the main body 41 toward the grooves 71a to 71f, 72a to 72f.

The guide slits 61a to 61f, 62a to 62f are categorized as either power wire guide slits 61a to 61f in which the power wires 51a to 51f are inserted, or neutral wire guide slits 62a to 62f in which the neutral wires 52a to 52f are inserted.

The power wire guide slits 61a to 61f include: a first U-phase power wire guide slit 61a in which the first U-phase power wire 51a is inserted and which is joined to the first U-phase power wire groove 71a; a second U-phase power wire guide slit 61b in which the second U-phase power wire 51b is inserted and which is joined to the second U-phase power wire groove 71b; a first V-phase power wire guide slit 61c in which the first V-phase power wire 51c is inserted and which is joined to the first V-phase power wire groove 71c; a second V-phase power wire guide slit 61d in which the second V-phase power wire 51d is inserted and which is joined to the second V-phase power wire groove 71d; a first W-phase power wire guide slit 61e in which the first W-phase power wire 51e is inserted and which is joined to the first W-phase power wire groove 71e; and a second W-phase power wire guide slit 61f in which the second W-phase power wire 51f is inserted and which is joined to the second W-phase power wire groove 51f.

The neutral wire guide slits 62a to 62f include: a first U-phase neutral wire guide slit 62a in which the first U-phase neutral wire 52a is inserted and which is joined to the first U-phase neutral wire groove 72a; a second U-phase neutral wire guide slit 62b in which the second U-phase neutral wire 52b is inserted and which is joined to the second U-phase neutral wire groove 72b; a first V-phase neutral wire guide slit 62c in which the first V-phase neutral wire 52c is inserted and which is joined to the first V-phase neutral wire groove 72c; a second V-phase neutral wire guide slit 62d in which the second V-phase neutral wire 52d is inserted and which is joined to the second V-phase neutral wire groove 72d; a first W-phase neutral wire guide slit 62e in which the first W-phase neutral wire 52e is inserted and which is joined to the first W-phase neutral wire groove 72e; and a second W-phase neutral wire guide slit 62f in which the second W-phase neutral wire 52f is inserted and which is joined to the second W-phase neutral wire groove 72f.

When other grooves are located at the inner circumferential side of the grooves 71a to 71f, 72a to 72f to which the guide slits 61a to 61f, 62a to 62f are joined, the guide slits 61a to 61f, 62a to 62f are formed to traverse other grooves. Thus, the first U-phase power wire guide slit 61a joined to the first U-phase power wire groove 71a is formed to traverse the second V-phase power wire groove 71d and the first W-phase power wire groove 71e. The second U-phase power wire guide slit 61b joined to the second U-phase power wire groove 71b is formed to traverse the second U-phase neutral wire groove 72b. The second W-phase power wire guide slit 61f joined to the second W-phase power wire groove 71f is formed to traverse the second V-phase power wire groove 71d and the second V-phase neutral wire groove 72d. Similarly, the first W-phase power wire guide slit 61e joined to the first W-phase power wire groove 71e is formed to traverse the first V-phase neutral wire groove 72c and the first W-phase neutral wire groove 72e. The first U-phase neutral wire guide slit 62a joined to the first U-phase neutral wire groove 72a is formed to traverse the second V-phase power wire groove 71d. The second W-phase neutral wire guide slit 62f joined to the second W-phase neutral wire groove 72f is formed to traverse the second V-phase power wire groove 71d. In the present embodiment, the guide slits 61a to 61f, 62a to 62f open at the inner circumference of the main body 41. Alternatively, a part or all of the guide slits 61a to 61f, 62a to 62f may open at the outer circumference of the main body 41.

Locking recesses 77 are formed in junctions between the guide slits 61a to 61f, 62a to 62f and the grooves 71a to 71f, 72a to 72f. The locking recesses 77 are circumferential cutouts along the grooves 71a to 71f, 72a to 72f. The locking recesses 77 are provided to lock the wires 16 that have been inserted in the guide slits 61a to 61f, 62a to 62f when fitting the wires 16 into the grooves 71a to 71f, 72a to 72f.

The collection grooves 67a to 67e are provided to collect the ends of the wires 16 to be connected. The collection grooves 67a to 67e are formed to extend from the grooves 71a to 71f, 72a to 72f toward the outer circumference of the main body 41. Therefore, in the collection grooves 67a to 67e, the ends of the wires 16 that have been fit along the grooves 71a to 71f, 72a to 72f in the circumferential direction are pulled out toward the outer side of the main body 41 in the radial direction.

The collection grooves 67a to 67e are categorized as either power wire collection grooves 67a to 67c for collecting the power wires 51a to 51f, or neutral wire collection grooves 67d, 67e for collecting the neutral wires 52a to 52f. The power wire collection grooves 67a to 67c include: a U-phase power wire collection groove 67a which is joined to the first U-phase power wire groove 71a and the second U-phase power wire groove 71b, and in which the first U-phase power wire 51a and the second U-phase power wire 51b are collected; a V-phase power wire collection groove 67b which is joined to the first V-phase power wire groove 71c and the second V-phase power wire groove 71d, and in which the first V-phase power wire 51c and the second V-phase power wire 51d are collected; and a W-phase power wire collection groove 67c which is joined to the first W-phase power wire groove 71e and the second W-phase power wire groove 71f, and in which the first W-phase power wire 51e and the second W-phase power wire 51f are collected. The neutral wire collection grooves 67d, 67e include: a first neutral wire collection groove 67d which is joined to the first U-phase neutral wire groove 72a, the second V-phase neutral wire groove 72d, and the second W-phase neutral wire groove 72f, and in which the first U-phase neutral wire 52a, the second V-phase neutral wire 52d, and the second W-phase neutral wire 52f are collected; and a second neutral wire collection groove 67e which is joined to the second U-phase neutral wire groove 72b, the first V-phase neutral wire groove 72c, and the first W-phase neutral wire groove 72e, and in which the second U-phase neutral wire 52b, the first V-phase neutral wire 52c, and the first W-phase neutral wire 52e are collected.

As shown in FIG. 5, the V-phase power wire collection groove 67b is formed along the radial direction. The U-phase power wire collection groove 67a and the W-phase power wire collection groove 67c are located close to each other with the V-phase power wire collection groove 67b interposed therebetween, and are formed to be substantially parallel to the V-phase power wire collection groove 67b. The U-phase power wire collection groove 67a and the W-phase power wire collection groove 67c have the same depth as the grooves 71a to 71f, 72a to 72f in which the wires 16 are fit. On the other hand, as shown in FIG. 7, the V-phase power wire collection groove 67b is formed to have a smaller depth than the grooves 71a to 71f, 72a to 72f in which the wires 16 are fit. This prevents the first V-phase power wire 51c and the second V-phase power wire 51d collected in the V-phase power wire collection groove 67b from coming into contact with the wires 16 fit inside the first U-phase power wire groove 71a and the first W-phase power wire groove 71e. Similarly, as shown in FIGS. 8 and 9, the first neutral wire collection groove 67d and the second neutral wire collection groove 67e are also formed to have a smaller depth than the grooves 71a to 71f, 72a to 72f in which the wires 16 are fit.

As shown in FIGS. 1 and 2, the positioning portions 45, which are formed to project from the outer circumference of the main body 41, latch with the latching portions 15 formed in the insulator 13 by snap-fit. The positions of the positioning portions 45 are set in such a manner that, when the positioning portions 45 latch with the latching portions 15, each of the guide slits 61a to 61f, 62a to 62f formed in the main body 41 is located at a position adjacent to an axial direction of a corresponding one of the coils U1 to U4, V1 to V4, W1 to W4. Engaging between the positioning portions 45 and the latching portions 15 is not limited to snap-fit, and may be achieved using any engaging mechanism that allows the routing member 40 to be fixed to the coils 12. The latching portions 15 may be provided in the stator core 11 instead of the insulator 13.

The cover 42 engages with the main body 41 using a non-illustrated interlocking mechanism, and covers the grooves 71a to 71f, 72a to 72f formed in the main body 41. As shown in FIG. 2, the cover 42 has openings 42a to 42e via which the distal ends of the wires 16 collected in the collection grooves 67a to 67e formed in the main body 41 are axially erected. The openings 42a to 42e are cutouts that axially penetrate through the cover 42, and extend from an outer circumference of the cover 42 in correspondence with the collection grooves 67a to 67e. Specifically, the following openings are provided: a U-phase power wire opening 42a that is formed to oppose the U-phase power wire collection groove 67a; a V-phase power wire opening 42b that is formed to oppose the V-phase power wire collection groove 67b; a W-phase power wire opening 42c that is formed to oppose the W-phase power wire collection groove 67c; a first neutral wire opening 42d that is formed to oppose the first neutral wire collection groove 67d; and a second neutral wire opening 42e that is formed to oppose the second neutral wire collection groove 67e.

Figure 3:
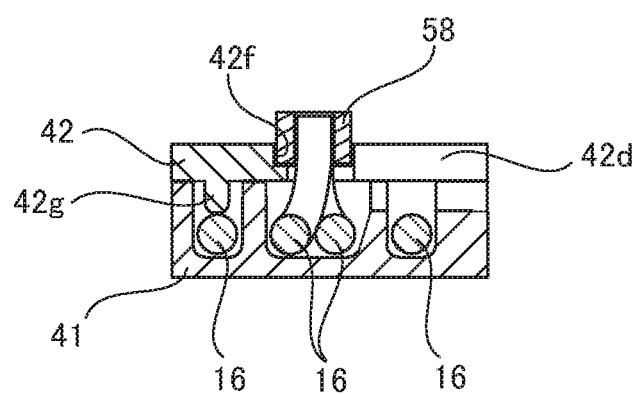
FIG. 3 is a cross-sectional view taken along the line of FIG. 2.

As shown in FIGS. 2 and 3, a stepped hole 42f is formed in the first neutral wire opening 42d to position a sleeve 58 that bundles the neutral wires 52a, 52d, 52f. The stepped hole 42f is a countersunk hole provided by drilling a surface of the cover 42 opposite to a surface of the cover 42 coming into contact with the main body 41. The stepped hole 42f is slightly larger than an external shape of the sleeve 58. When connecting the neutral wires 52a, 52d, 52f, the sleeve 58 positioned in the stepped hole 42f bundles the neutral wires 52a, 52d, 52f. This enables a quick wire connection operation. The stepped hole 42f is formed similarly in the second neutral wire opening 42e as well.

The cover 42 also has pressing protrusions 42g for pressing the wires 16 that have been fit in the grooves 71a to 71f, 72a to 72f formed in the main body 41. As shown in FIG. 1 or 3, the pressing protrusions 42g are formed to project from the surface of the cover 42 facing the main body 41 in correspondence with the positions of the grooves 71a to 71f, 72a to 72f. As the wires 16 that have been fit in the grooves 71a to 71f, 72a to 72f are pressed and fixed in place by the pressing protrusions 42g, movements of the wires 16 inside the grooves 71a to 71f, 72a to 72f caused by vibrations and the like can be suppressed.

A description is now given of a method of manufacturing the stator unit 10 structured in the foregoing manner.

First, a winding process is performed to wind the wires 16 around the insulator 13 mounted on the stator core 11 to form the coils 12. In the winding process, two adjacently arranged coils of each coil group of each phase are formed from one wire 16. Specifically, the first U-phase coil U1 and the second U-phase coil U2 that are adjacently arranged are formed from one wire 16. Other coils are formed in a similar manner.

After the winding process, a pullout process is performed to pull out the ends of the wires 16 of the coils U1 to U4, V1 to V4, W1 to W4. In the pullout process, the winding start portions and the winding end portions of the wires 16 are pulled out from the coils U1 to U4, V1 to V4, W1 to W4 toward a side where the routing member 40 is to be mounted. Specifically, the first U-phase power wire 51a representing a winding start portion of a wire 16 is pulled out from the first U-phase coil U1 toward the side where the routing member 40 is to be mounted, and the first U-phase neutral wire 52a representing a winding end portion of the wire 16 is pulled out from the second U-phase coil U2 toward the side where the routing member 40 is to be mounted. The wires 16 are similarly pulled out from other coils toward the same side.

After the pullout process, a mounting process is performed to mount the main body 41 of the routing member 40 on the insulator 13. In the mounting process, the positioning portions 45 of the main body 41 latch with the latching portions 15 of the insulator 13. As a result, the main body 41 is fixed to the insulator 13. Furthermore, in the mounting process, the wires 16 that have been pulled out in the pullout process are inserted into the guide slits 61a to 61f, 62a to 62f of the main body 41. Specifically, the first U-phase power wire 51a that has been pulled out from the first U-phase coil U1 is inserted into the first U-phase power wire guide slit 61a, and the first U-phase neutral wire 52a that has been pulled out from the second U-phase coil U2 is inserted into the first U-phase neutral wire guide slit 62a. Each of the wires 16 that have been pulled out from other coils is similarly inserted into a corresponding one of the guide slits 61b to 61f, 62b to 62f.

After the mounting process, a routing process is performed to route the wires 16 that have been pulled out by fitting the wires 16 into the grooves 71a to 71f, 72a to 72f formed in the main body 41 of the routing member 40. In the routing process, the wires 16 inserted in the guide slits 61a to 61f, 62a to 62f are locked in the locking recesses 77, and then fit inside the grooves 71a to 71f, 72a to 72f. Once each wire 16 reaches a corresponding one of the collection grooves 67a to 67e, it is bent toward the outer side in the radial direction along the corresponding one of the collection grooves 67a to 67e, and pulled out toward the outer circumference of the main body 41. Specifically, the first U-phase power wire 51a inserted in the first U-phase power wire guide slit 61a is locked in the locking recess 77 formed in the first U-phase power wire groove 71a, and then fit into the first U-phase power wire groove 71a. Thereafter, once the first U-phase power wire 51a reaches the U-phase power wire collection groove 67a, the first U-phase power wire 51a is bent along the U-phase power wire collection groove 67a, and then pulled out toward the outer circumference of the main body 41. Each of the wires 16 that have been pulled out from other coils is similarly fit into a corresponding one of the grooves 71b to 71f, 72a to 72f, and guided to a corresponding one of the collection grooves 67a to 67e. When the holding protrusions 78 are provided in the grooves 71a to 71f, 72a to 72f, the wires 16 are pushed toward the bottom surfaces 79a to be located between the holding protrusions 78 and the bottom surfaces 79a.

The order of routing of the wires 16 in the routing process will now be described.

In the present embodiment, the grooves 71a to 71f, 72a to 72f are separated from one another in the radial direction, and the guide slits 61a to 61f, 62a to 62f for guiding the wires 16 to the grooves 71a to 71f, 72a to 72f open at the inner circumference of the main body 41. Therefore, for example, if a wire 16 is fit into the first W-phase power wire groove 71e formed at the inner circumferential side prior to the first U-phase power wire groove 71a formed at the outer circumferential side, then the fit wire 16 blocks the first U-phase power wire guide slit 61a joined to the first U-phase power wire groove 71a. This makes it difficult to guide a wire 16 to the first U-phase power wire groove 71a via the first U-phase power wire guide slit 61a. For this reason, in the routing process, the wires 16 are fit in order from the grooves located farthest from the inner circumference of the main body 41 at which the guide slits 61a to 61f, 62a to 62f open.

Specifically, at first, a wire 16 is fit into each of the first U-phase power wire groove 71a, the second U-phase power wire groove 71b, and the second W-phase power wire groove 71f that are located outermost in the radial direction of the main body 41. Subsequently, a wire 16 is fit into each of the first W-phase power wire groove 71e, the first U-phase neutral wire groove 72a, the second V-phase neutral wire groove 72d, and the second W-phase neutral wire groove 72f that are located at the inner side of the foregoing grooves 71a, 71b, 71f. Finally, a wire 16 is fit into each of the first V-phase power wire groove 71c, the second V-phase power wire groove 71d, the second U-phase neutral wire groove 72b, the first V-phase neutral wire groove 72c, and the first W-phase neutral wire groove 72e that are located innermost in the radial direction of the main body 41.

In the present embodiment, all guide slits 61a to 61f, 62a to 62f open at the inner circumference of the main body 41. In an alternative case where all guide slits 61a to 61f, 62a to 62f open at the outer circumference of the main body 41, the wires 16 are fit in order from the grooves located farthest from the outer circumference of the main body 41, that is to say, the innermost grooves of the main body 41.

In another alternative case where a part of the guide slits 61a to 61f, 62a to 62f opens at the outer circumference of the main body 41 and the remaining part of the guide slits 61a to 61f, 62a to 62f opens at the inner circumference of the main body 41, the wires 16 are fit as follows. In a group of grooves joined to the part of the guide slits 61a to 61f, 62a to 62f opening at the outer circumference, the wires 16 are fit in order from the grooves located farthest from the outer circumference of the main body 41. In a group of grooves joined to the remaining part of the guide slits 61a to 61f, 62a to 62f opening at the inner circumference, the wires 16 are fit in order from the grooves located farthest from the inner circumference of the main body 41. In this case, fitting of the wires 16 may be started from either group of grooves.

Figure 10:
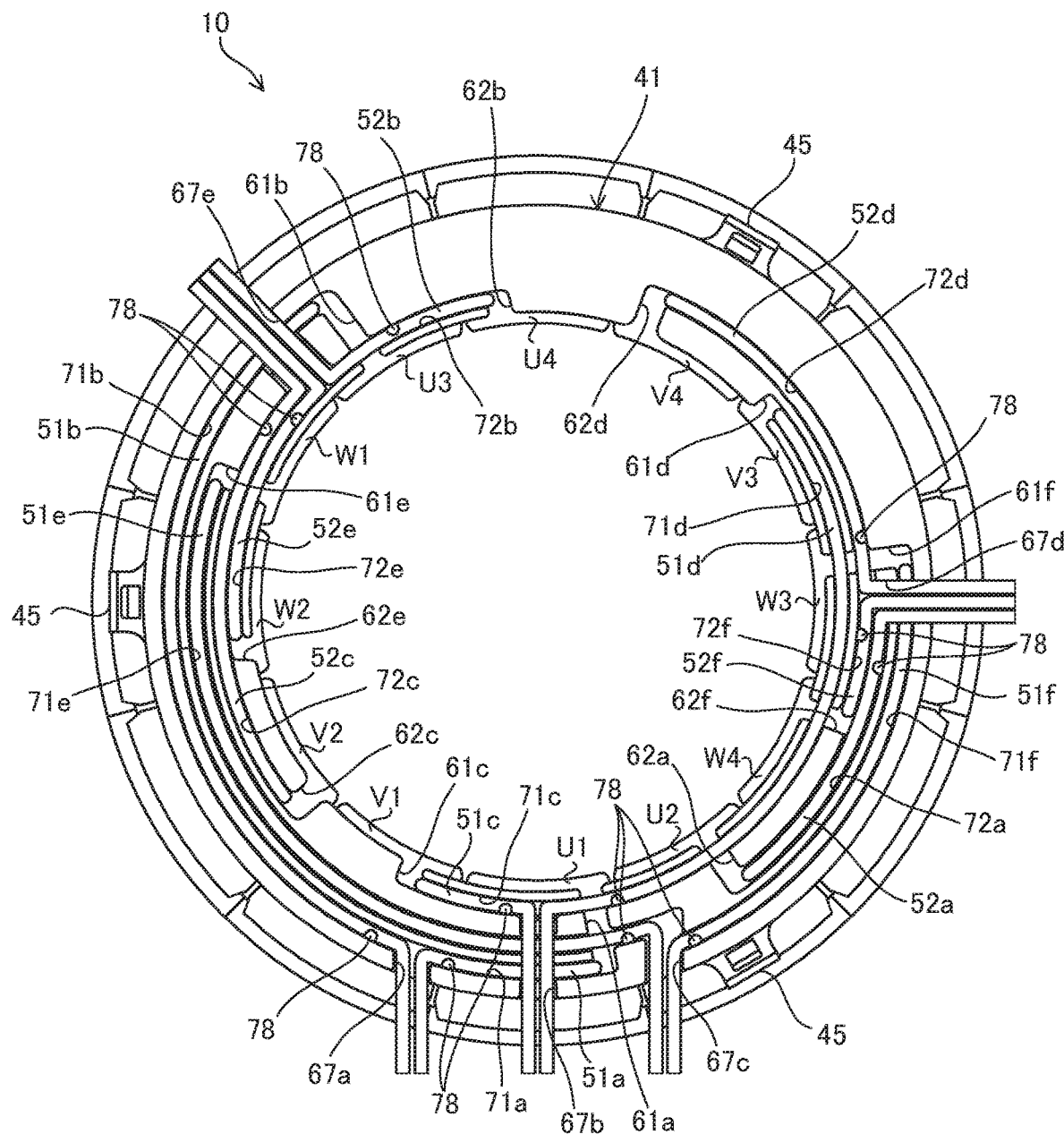
FIG. 10 is an explanatory diagram of a method of manufacturing the stator unit according to the embodiment of the present invention.

FIG. 10 shows the stator unit 10 in a state where the routing process has been completed. In this state, the twelve wires 16 that have been pulled out from the coils U1 to U4, V1 to V4, W1 to W4 are inserted in the guide slits 61a to 61f, 62a to 62f, fitted in the grooves 71a to 71f, 72a to 72f, and pulled out toward the outer circumference of the main body 41 along the collection grooves 67a to 67e.

After the routing process, a fixing process is performed to fix in place the wires 16 that have been fit in the grooves 71a to 71f, 72a to 72f using the pressing protrusions 42g provided in the cover 42. In the fixing process, the cover 42 engages with the main body 41 using a non-illustrated engaging mechanism, and an engaging force thereof allows the pressing protrusions 42g provided in the cover 42 to press and fix the wires 16 that have been fit in the grooves 71a to 71f, 72a to 72f. The pressing protrusions 42g may be provided especially at the positions where they press the wires 16 fit in the first U-phase power wire groove 71a and the first W-phase power wire groove 71e intersecting with the V-phase power wire collection groove 67b, the second W-phase power wire groove 71f intersecting with the first neutral wire collection groove 67d, and the second U-phase power wire groove 71b intersecting with the second neutral wire collection groove 67e. In this way, contact between the wires 16 collected in the collection grooves 67b, 67d, 67e and the wires 16 fit inside the grooves 71a, 71b, 71e, 71f can be avoided.

After the fixing process, a connection process is performed to connect the power wires 51a to 51f and to connect the neutral wires 52a to 52f. As shown in FIG. 2, when connecting the power wires 51a to 51f in the connection process, the first U-phase power wire 51a and the second U-phase power wire 51b that have been collected in the U-phase power wire collection groove 67a are axially erected via the U-phase power wire opening 42a and connected by, for example, soldering to serve as the U-phase terminal 50a. Similarly, the first V-phase power wire 51c and the second V-phase power wire 51d that have been collected in the V-phase power wire collection groove 67b are connected to serve as the V-phase terminal 50b, and the first W-phase power wire 51e and the second W-phase power wire 51f that have been collected in the W-phase power wire collection groove 67c are connected to serve as the W-phase terminal 50c. When connecting the power wires 51a to 51f, metal terminals may be attached to enable easy connection to an external power source. Furthermore, before the wire connection, the ends of the wires 16 may be cut off so that the power wires 51a to 51f have a uniform length.

When connecting the neutral wires 52a to 52f in the connection process, the first U-phase neutral wire 52a, the second V-phase neutral wire 52d, and the second W-phase neutral wire 52f that have been collected in the first neutral wire collection groove 67d are axially erected via the first neutral wire opening 42d and bundled by the sleeve 58. Once the sleeve 58 has been positioned in the stepped hole 42f, the first U-phase neutral wire 52a, the second V-phase neutral wire 52d, and the second W-phase neutral wire 52f are connected by soldering, together with the sleeve 58, to serve as the first neutral point 50d. Similarly, the second U-phase neutral wire 52b, the first V-phase neutral wire 52c, and the first W-phase neutral wire 52e that have been collected in the second neutral wire collection groove 67e are connected to serve as the second neutral point 50e. Before the wire connection, the ends of the wires 16 may be cut off so that the neutral wires 52a to 52f have a uniform length.

The foregoing embodiment achieves the following effects.

The stator unit 10 is manufactured by arranging the routing member 40, which includes the plurality of grooves 71a to 71f, 72a to 72f, adjacent to the plurality of coils U1 to U4, V1 to V4, W1 to W4, and by fitting each of the wires 16 pulled out from the coils U1 to U4, V1 to V4, W1 to W4 into a corresponding one of the grooves 71a to 71f, 72a to 72f in the routing member 40. In this way, tangling and misconnection of the wires 16 can be avoided. Furthermore, as the wires 16 can be routed without using a special jig, the manufacturing efficiency of the stator unit 10 can be increased.

The grooves 71a to 71f, 72a to 72f are formed to be concentric in the routing member 40 formed into a circular ring shape. Accordingly, the grooves 71a to 71f, 72a to 72f in which the wires 16 are routed can be arranged without wasting space, and the stator unit 10 can be made compact.

As the guide slits 61a to 61f, 62a to 62f for guiding the wires 16 to be fit into the grooves 71a to 71f, 72a to 72f are provided at the positions corresponding to the coils U1 to U4, V1 to V4, W1 to W4, the wires 16 that have been pulled out from the coils U1 to U4, V1 to V4, W1 to W4 can be smoothly guided to the grooves 71a to 71f, 72a to 72f. Thus, the manufacturing efficiency of the stator unit 10 can be increased.

When fitting the wires 16 inserted in the guide slits 61a to 61f, 62a to 62f into the grooves 71a to 71f, 72a to 72f, the wires 16 are locked in the locking recesses 77 formed in the grooves 71a to 71f, 72a to 72f. This allows the wires 16 to be smoothly fit into the grooves 71a to 71f, 72a to 72f. Thus, the manufacturing efficiency of the stator unit 10 can be increased.

Once the wires 16 have been fit inside the grooves 71a to 71f, 72a to 72f, the holding protrusions 78 prevent the wires 16 from coming off the grooves 71a to 71f, 72a to 72f. Thus, the manufacturing efficiency of the stator unit 10 can be increased.

The wires 16 that have been fit inside the grooves 71a to 71f, 72a to 72f are collected into the openings 42a to 42e provided in the cover 42 and then connected at one end. This enables a quick wire connection operation.

Once the wires 16 have been fit inside the grooves 71a to 71f, 72a to 72f, the wires 16 are pressed and fixed by the pressing protrusions 42g provided in the cover 42, and thus movements of the wires 16 caused by vibrations and the like are hindered. This can suppress contact between one wire 16 and other wires 16, as well as damage of the wires 16 from hitting the side surfaces 79b.

The stator unit 10 is manufactured through the winding process of forming the coils U1 to U4, V1 to V4, W1 to W4, the pullout process of pulling out the ends of the wires 16 of the coils U1 to U4, V1 to V4, W1 to W4, the mounting process of mounting the routing member 40 on the insulator 13 or the stator core 11, and the routing process of fitting the wires 16 that have been pulled out from the coils U1 to U4, V1 to V4, W1 to W4 into the grooves 71a to 71f, 72a to 72f formed in the routing member 40. In this way, tangling and misconnection of the wires 16 can be avoided. Furthermore, as the wires 16 can be routed without using a special jig, the manufacturing efficiency of the stator unit 10 can be increased.

In the routing process, the wires 16 are fit in order from the grooves located farthest from the outer circumference or the inner circumference of the routing member 40 at which the guide slits 61a to 61f, 62a to 62f open. In this way, tangling and misconnection of the wires 16 can be avoided. Thus, the manufacturing efficiency of the stator unit 10 can be increased.

After the wires 16 that have been fit in the grooves 71a to 71f, 72a to 72f are pressed and fixed by the pressing protrusions 42g provided in the cover 42, the power wires 51a to 51f as well as the neutral wires 52a to 52f are connected. This can prevent contact between one wire 16 and other wires 16 to be connected.

Figure 11:
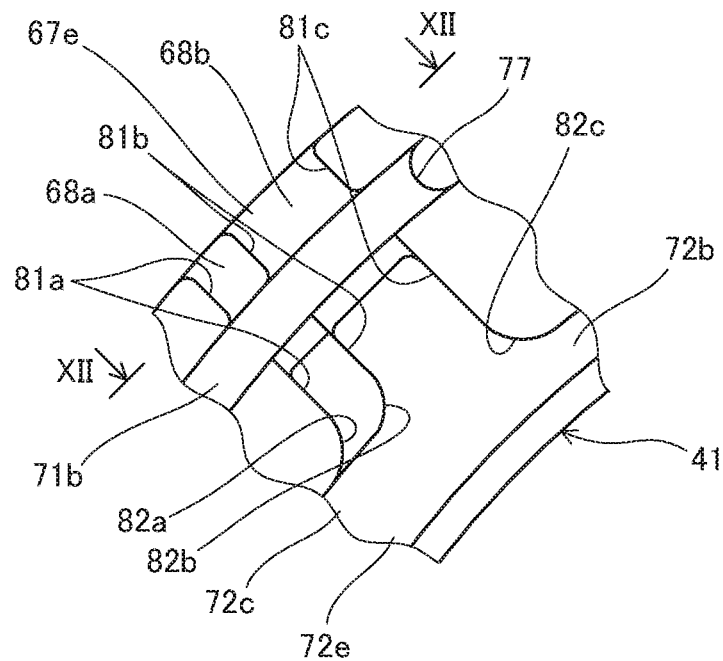
FIG. 11 shows the routing member of the stator unit according to a modification example of the embodiment of the present invention.
Figure 12:
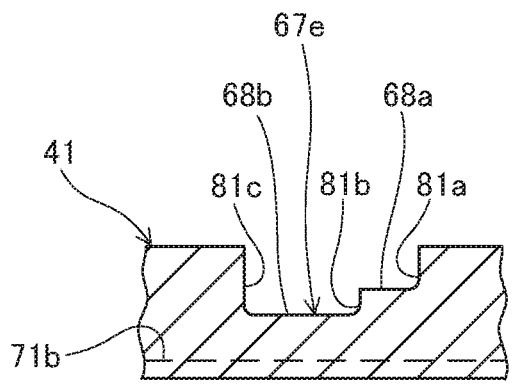
FIG. 12 is a cross-sectional view taken along the line XII-XII of FIG. 11.
Figure 13:
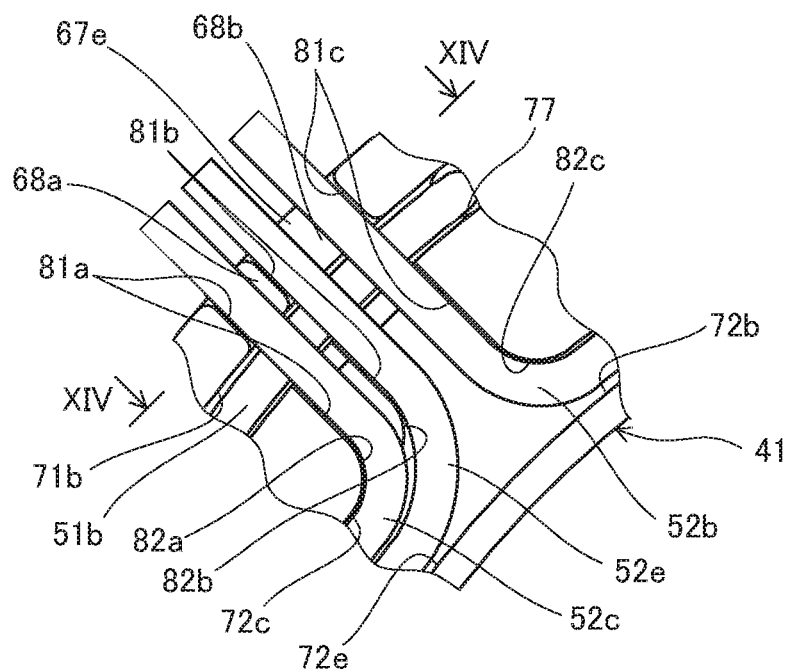
FIG. 13 is an explanatory diagram of a method of manufacturing the stator unit according to a first modification example of the embodiment of the present invention.
Figure 14:
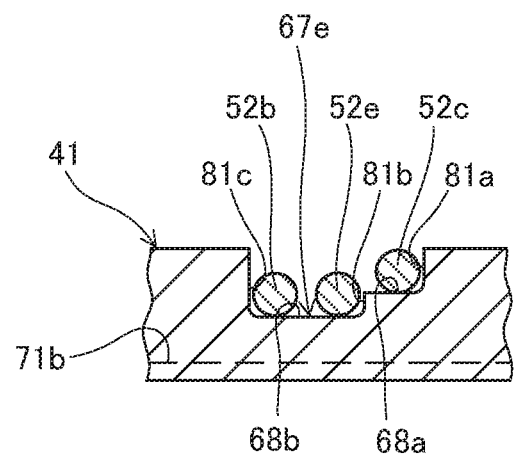
FIG. 14 is a cross-sectional view taken along the line XIV-XIV of FIG. 13.

The following describes a first modification example of the stator unit 10 according to the embodiment of the present invention with reference to FIGS. 11 to 14. FIG. 11 is an enlarged view of a section XI of FIG. 5, and explicitly shows characteristic portions of the first modification example. FIG. 12 is a cross-sectional view taken along the line XII-XII of FIG. 11. FIG. 13 shows a state in which the wires 16 have been routed in the main body 41 of the routing member 40 shown in FIG. 11. FIG. 14 is a cross-sectional view taken along the line XIV-XIV of FIG. 13.

In the above-described embodiment, the collection groove 67e has a flat bottom surface. In an alternative design of the first modification example, as shown in FIGS. 11 and 12, the collection groove 67e has two bottom surfaces of different depths, namely, a first bottom surface 68a and a second bottom surface 68b. The second bottom surface 68b is formed continuously with the first bottom surface 68a, and has a larger depth than the first bottom surface 68a.

The collection groove 67e also has guide walls 81a to 81c for leading the wires 16 routed in the grooves 72b, 72c, 72e joined to the collection groove 67e to the inside of the collection grooves 67e. Specifically, the collection groove 67e has a first guide wall 81a that axially rises from the first bottom surface 68a, a second guide wall 81b connecting the first bottom surface 68a and the second bottom surface 68b, and a third guide wall 81c that axially rises from the second bottom surface 68b. These guide walls 81a to 81c are formed along the radial direction in which the collection groove 67e extends, and located at predetermined intervals in a circumferential direction of the routing member 40, that is to say, a width direction of the collection groove 67e.

Furthermore, arc surfaces 82a to 82c are provided at junctions between the grooves 72b, 72c, 72e and the guide walls 81a to 81c. Specifically, a first arc surface 82a is formed at a junction between the first guide wall 81a and the first V-phase neutral wire groove 72c, a second arc surface 82b is formed at a junction between the second guide wall 81b and the first W-phase neutral wire groove 72e, and a third arc surface 82c is formed at a junction between the third guide wall 81c and the second U-phase neutral wire groove 72b. Although not illustrated, guide walls and arc surfaces are similarly provided in other collection grooves 67a to 67d as well. Note that the number of guide walls provided in each of the collection grooves 67a to 67d is set in correspondence with the number of wires 16 collected in each of the collection grooves 67a to 67d.

In the first modification example with the foregoing structure, when collecting the wires 16 into the collection grooves 67a to 67e in the routing process, each of the wires 16 that have been routed in the grooves 71a to 71f, 72a to 72f is led along a one of the guide walls to the inside of a corresponding one of the collection grooves 67a to 67e.

Specifically, as shown in FIG. 13, the first V-phase neutral wire 52c fit in the first V-phase neutral wire groove 72c is bent along the first arc surface 82a, and led along the first guide wall 81a to the inside of the collection groove 67e. The first W-phase neutral wire 52e fit in the first W-phase neutral wire groove 72e is bent along the second arc surface 82b, and led along the second guide wall 81b to the inside of the collection groove 67e. The second U-phase neutral wire 52b fit in the second U-phase neutral wire groove 72b is bent along the third arc surface 82c, and led along the third guide wall 81c to the inside of the collection groove 67e. With regard to other collection grooves 67a to 67d, the wires 16 are similarly led along the arc surfaces and the guide walls to the inside of the collection grooves 67a to 67d.

As such, each of the wires 16 to be collected into the collection grooves 67a to 67e is led from a corresponding one of the grooves 71a to 71f, 72a to 72f to the inside of a corresponding one of the collection grooves 67a to 67e along a corresponding one of the guide walls. Therefore, as shown in FIG. 14, the wires 16 to be collected into the collection grooves 67a to 67e do not overlap one another in the axial direction and are aligned in the circumferential direction of the routing member 40, that is to say, the width directions of the collection grooves 67a to 67e, at one end.

In the connection process performed after the routing process and the fixing process, the wires 16 that have been collected in the collection grooves 67a to 67e are axially erected via the openings 42a to 42e of the cover 42, and then connected.

Once the routing process has been completed, the three wires 52b, 52c, 52e that have been collected into the collection grooves 67a to 67e are positionally misaligned in a depth direction to some extent inside the collection groove 67e, but do not overlap one another in a direction in which they are erected, i.e., the axial direction, as shown in FIG. 14. Therefore, the three wires 52b, 52c, 52e can be axially erected in a smooth manner via the opening 42e of the cover 42 without getting tangled. When erecting the three wires 52b, 52c, 52e, they are adjusted to be lined up along a straight line at one end. Then, as shown in FIG. 2, the sleeve 58 is fit, and the three wires 52b, 52c, 52e are connected by soldering together with the sleeve 58.

As such, the wires 16 that have been collected in the collection grooves 67a to 67e are erected without getting tangled. Therefore, there is no need to untangle the tangled wires 16 in the connection process. As tangling of the wires 16 is prevented, the wires 16 can be lined up along a crosswise line at one end in the course of erecting the wires 16.

If the plurality of wires 16 are simply collected into the collection grooves 67a to 67e without using the guide walls, then the wires 16 overlap one another inside the collection grooves 67a to 67e. Erecting the wires 16 in such an overlapping state would make the wires 16 tangled and misaligned at one end. This makes it necessary to separately perform an adjustment operation of untangling the tangled wires 16 and aligning the wires 16 along a crosswise line at one end before wire connection, because the wires 16 need to be aligned along a crosswise line at one end to be connected.

As described above, in the first modification example, the wires 16 are aligned in the width directions of the collection grooves 67a to 67e at one end upon completion of the routing process. Therefore, when erecting the wires 16 in the connection process, the wires 16 do not get tangled and can easily be aligned along a crosswise line at one end. As a result, there is no need to separately perform the adjustment operation, and the efficiency of a wire connection operation can be increased. Especially, in a neutral wire connection operation of connecting many wires 16, operation time can be reduced significantly as the adjustment operation is not required.

As the junctions between the grooves 71a to 71f, 72a to 72f and the guide walls are formed like arc surfaces, the wires can be led to the inside of the collection grooves 67a to 67e more smoothly.

If the led wires 16 overlap one another inside the collection grooves 67a to 67e and thus do not fit inside the collection grooves 67a to 67e, then it will be difficult to fix the cover 42 to the main body 41. As described above, in the first modification example, the wires 16 do not overlap one another in a mounting direction of the cover 42, that is to say, the axial direction, and hence the cover 42 can easily be attached.

Note that the guide walls may be made up of side walls of the collection groove 67e as described above, or may be partition walls in the form of thin plates formed to project from the bottom surfaces of the collection groove 67e. In terms of shape, the guide walls may be continuous or intermittent in the direction in which the collection groove 67e extends. The guide walls may be constructed in any manner as long as the wires 16 can be led separately to the inside of the collection groove 67e.

Figure 15:
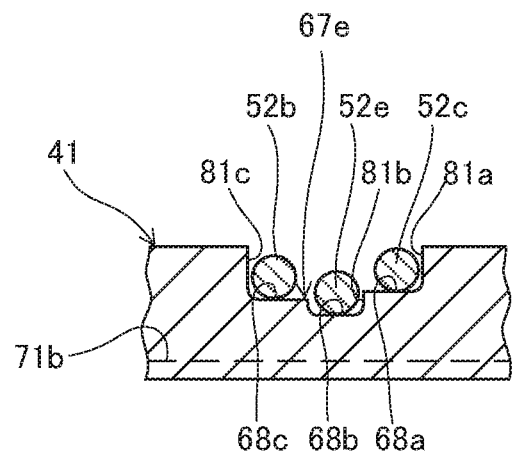
FIG. 15 is a cross-sectional view of the stator unit according to a second modification example of the embodiment of the present invention, and is equivalent to FIG. 14.
Figure 16:
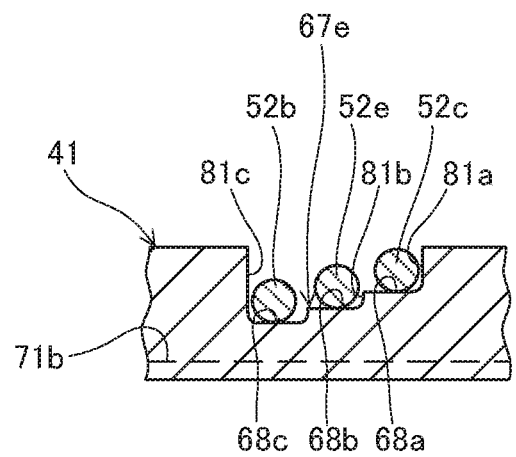
FIG. 16 is a cross-sectional view of the stator unit according to a third modification example of the embodiment of the present invention, and is equivalent to FIG. 14.

In the above-described first modification example, the collection groove 67e has two bottom surfaces 68a and 68b of different depths. Alternatively, the collection groove 67e may have a first bottom surface 68a, a second bottom surface 68b, and a third bottom surface 68c of different depths, as in a second modification example shown in FIG. 15 and a third modification example shown in FIG. 16. In these cases, the three wires 52b, 52c, 52e to be collected into the collection groove 67e are led along guide walls 81a, 81b, 81c that axially rise from the bottom surfaces 68a, 68b, 68c, respectively. By thus providing the collection groove 67e with as many bottom surfaces 68a, 68b, 68c as the wires 52b, 52c, 52e collected in the collection groove 67e, the wires 16 can be reliably prevented from overlapping one another inside the collection groove 67e. Note that the first bottom surface 68a and the third bottom surface 68c shown in FIG. 15 may have the same depth. The bottom surfaces 68a, 68b, 68c may be provided in any manner as long as the guide walls 81a, 81b, 81c for leading the wires 52b, 52c, 52e are formed.

The structures, functions, and effects of the embodiment of the present invention will be collectively described below.

The stator unit 10 provided with the plurality of coils 12 includes the stator core 11 around which the coils 12 are wound, and the routing member 40 provided with the plurality of grooves 71a to 71f, 72a to 72f in which the wires 16 extending from the coils 12 are routed.

With the foregoing structure, the stator unit 10 is manufactured by fitting each of the wires 16 extending from the coils U1 to U4, V1 to V4, W1 to W4 into a corresponding one of the grooves 71a to 71f, 72a to 72f provided in the routing member 40. In this way, tangling and misconnection of the wires 16 can be avoided when connecting the wires 16. Furthermore, the wires 16 can be routed simply by fitting each wire 16 into a corresponding one of the grooves 71a to 71f, 72a to 72f without using a special jig. As a result, the manufacturing efficiency of the stator unit 10 can be increased.

The routing member 40 has a ring shape, and the plurality of grooves 71a to 71f, 72a to 72f are formed to be concentric.

With the foregoing structure, the grooves 71a to 71f, 72a to 72f are formed to be concentric in the routing member 40 formed into a circular ring shape. Accordingly, the grooves 71a to 71f, 72a to 72f in which the wires 16 are routed can be arranged without wasting space, and the stator unit 10 can be made compact.

The routing member 40 includes the guide slits 61a to 61f, 62a to 62f that are formed from the outer circumference or the inner circumference of the routing member 40 toward the grooves 71a to 71f, 72a to 72f, and that guide the wires 16 to be routed in the grooves 71a to 71f, 72a to 72f. The guide slits 61a to 61f, 62a to 62f are provided at the positions corresponding to the coils U1 to U4, V1 to V4, W1 to W4.

With the foregoing structure, the guide slits 61a to 61f, 62a to 62f that guide the wires 16 to be fit into the grooves 71a to 71f, 72a to 72f are provided at the positions corresponding to the coils U1 to U4, V1 to V4, W1 to W4. This allows the wires 16 extending from the coils U1 to U4, V1 to V4, W1 to W4 to be smoothly guided to the grooves 71a to 71f, 72a to 72f. As a result, the manufacturing efficiency of the stator unit 10 can be increased.

The grooves 71a to 71f, 72a to 72f have locking recesses 77 at junctions with the guide slits 61a to 61f, 62a to 62f. The locking recesses 77 are recessed in the circumferential direction.

With the foregoing structure, when fitting the wires 16 inserted in the guide slits 61a to 61f, 62a to 62f into the grooves 71a to 71f, 72a to 72f, the wires 16 are locked in the locking recesses 77 formed in the grooves 71a to 71f, 72a to 72f. This allows the wires 16 to be smoothly fit into the grooves 71a to 71f, 72a to 72f. As a result, the manufacturing efficiency of the stator unit 10 can be increased.

The routing member 40 includes the cover 42 that covers the grooves 71a to 71f, 72a to 72f, and that has the openings 42a to 42e via which the wires 16 routed in the grooves 71a to 71f, 72a to 72f are pulled out at one end so as to be connected.

With the foregoing structure, the wires 16 that have been fit inside the grooves 71a to 71f, 72a to 72f are pulled out via the openings 42a to 42e of the cover 42 and then connected at one end. This enables a quick wire connection operation.

The routing member 40 includes the cover 42 that covers the grooves 71a to 71f, 72a to 72f, and that has the pressing protrusions 42g for pressing the wires 16 routed inside the grooves 71a to 71f, 72a to 72f.

With the foregoing structure, the wires 16 that have been fit inside the grooves 71a to 71f, 72a to 72f are pressed and fixed in place by the pressing protrusions 42g of the cover 42. This can prevent movements of the wires 16 caused by vibrations and the like, and suppress contact between one wire 16 and other wires 16, as well as damage of the wires 16 from hitting the side surfaces 79b.

The routing member 40 includes the collection grooves 67a to 67e which are joined to the grooves 71a to 71f, 72a to 72f, and in which the wires 16 routed in the grooves 71a to 71f, 72a to 72f are collected at one end. The collection grooves 67a to 67e have the plurality of guide walls 81a to 81c that are arranged along the directions in which the collection grooves 67a to 67e extend. Each wire 16 is led from a corresponding one of the grooves 71a to 71f, 72a to 72f to the inside of a corresponding one of the collection grooves 67a to 67e along a corresponding one of the guide walls 81a to 81c.

The guide walls 81a to 81c are arranged so as to allow the wires 16 to be lined up in the width directions of the collection grooves 67a to 67e at one end.

With the foregoing structure, each of the wires 16 to be collected into the collection grooves 67a to 67e is led from a corresponding one of the grooves 71a to 71f, 72a to 72f to the inside of a corresponding one of the collection grooves 67a to 67e along a corresponding one of the guide walls. Therefore, inside the collection grooves 67a to 67e, the wires 16 collected therein do not overlap one another in the axial direction and are aligned in the width directions of the collection grooves 67a to 67e at one end. As a result, there is no need to perform an operation of aligning the wires 16 along a crosswise line at one end when connecting the wires 16, and the efficiency of a wire connection operation can be increased.

The junctions between the guide walls 81a to 81c and the grooves 71a to 71f, 72a to 72f are formed like arc surfaces.

With the foregoing structure, as the junctions between the grooves 71a to 71f, 72a to 72f and the guide walls 81a to 81c are formed like arc surfaces, the wires 16 can be led more smoothly from the grooves 71a to 71f, 72a to 72f to the inside of the collection grooves 67a to 67e.

The rotary electric machine 100 includes the stator unit 10 and the rotor 20 that are structured in the above-described manner.

With the foregoing structure, the rotary electric machine 100 includes the stator unit 10 that is structured to increase the manufacturing efficiency. Therefore, the manufacturing efficiency of the rotary electric machine 100 can be increased.

A method of manufacturing the stator unit 10 includes the winding process of winding the plurality of wires 16 around the stator core 11 to form the plurality of coils 12, the pullout process of pulling out the ends of the wires 16 of the coils 12, the mounting process of mounting the routing member 40 in which the wires 16 that have been pulled out from the coils 12 are to be routed, and the routing process of routing the wires 16 that have been pulled out from the coils 12 in the grooves 71a to 71f, 72a to 72f formed in the routing member 40.

With the foregoing method, the stator unit 10 is manufactured through the winding process, the pullout process, the mounting process, and the routing process. This prevents tangling and misconnection of the wires 16 when connecting the wires 16. Furthermore, the wires 16 can be routed simply by fitting each wire 16 into a corresponding one of the grooves 71a to 71f, 72a to 72f without using a special jig. As a result, the manufacturing efficiency of the stator unit 10 can be increased.

In the routing process, the first wires to be routed among the wires 16 are the wires to be routed in the grooves located farthest from the outer circumference or the inner circumference of the routing member 40 at which the guide slits 61a to 61f, 62a to 62f open. The last wires to be routed among the wires 16 are the wires to be routed in the grooves located nearest to the outer circumference or the inner circumference of the routing member 40 at which the guide slits 61a to 61f, 62a to 62f open. The guide slits 61a to 61f, 62a to 62f guide the wires 16 to be routed in the grooves 71a to 71f, 72a to 72f.

With the foregoing method, in the routing process, the wires 16 are fit in order from the grooves located farthest from the outer circumference or the inner circumference of the routing member 40 at which the guide slits 61a to 61f, 62a to 62f open. This prevents tangling of the wires 16 when fitting the wires 16 into the grooves. As a result, the manufacturing efficiency of the stator unit 10 can be increased.

The routing process includes a process of leading each of the wires 16 that have been routed in the grooves 71a to 71f, 72a to 72f to the inside of a corresponding one of the collection grooves 67a to 67e, which are joined to the grooves 71a to 71f, 72a to 72f, along a corresponding one of the guide walls 81a to 81c.

With the foregoing method, each of the wires 16 to be collected into the collection grooves 67a to 67e is led from a corresponding one of the grooves 71a to 71f, 72a to 72f to the inside of one of the collection grooves 67a to 67e. Therefore, the wires 16 collected into the collection grooves 67a to 67e do not overlap one another in the depth direction and are aligned in the width directions of the collection grooves 67a to 67e at one end. As a result, there is no need to perform an operation of aligning the wires 16 along a crosswise line at one end when connecting the wires 16, and the efficiency of a wire connection operation can be increased.

The embodiments of the present invention described above are merely illustration of some application examples of the present invention and not of the nature to limit the technical scope of the present invention to the specific constructions of the above embodiments.

For example, although the rotary electric machine 100 is a three-phase alternating-current motor in the present embodiment, the rotary electric machine 100 may be a two-phase alternating-current motor. Although the number of the coils is 12, the number of the coils may be any number that is generally applied to a motor.

The coils are not limited to being connected in accordance with a Y connection, and may be connected in accordance with a delta connection. In this case, the routing member 40 may not be provided with grooves in which the neutral wires are routed.

In the present embodiment, the insulator 13 is mounted on the stator core 11 for insulation between the stator core 11 and the wires 16. However, the insulator 13 may be removed when coated wires 16 are used, as long as no insulation problem arises.

In the present embodiment, the wires 16 are guided to the grooves 71a to 71f, 72a to 72f via the guide slits 61a to 61f, 62a to 62f. Alternatively, the wires 16 may be guided to the grooves 71a to 71f, 72a to 72f by forming through holes in the bottom surfaces of the grooves 71a to 71f, 72a to 72f and inserting the wires 16 through the through holes.

In the present embodiment, the grooves 71a to 71f, 72a to 72f formed in the routing member 40 are located on a top surface of the main body 41 and arranged in the radial direction or the circumferential direction. Alternatively, the grooves 71a to 71f, 72a to 72f may be located on a side surface of the main body 41. In this case, the grooves 71a to 71f, 72a to 72f are arranged in the axial direction or the circumferential direction.

Although the routing member 40 has a circular ring shape in the present embodiment, the routing member 40 may have a polygonal shape, such as a hexagonal shape and an octagonal shape, and may have a ring shape formed by round chamfering the corners of a polygon.

The present application claims a priority based on Japanese Patent Application No. 2014-140720 filed with the Japan Patent Office on Jul. 8, 2014 and Japanese Patent Application No. 2015-88604 filed with the Japan Patent Office on Apr. 23, 2015, all the contents of which are hereby incorporated by reference.

The invention claimed is:

1. A stator unit for including a plurality of coils, comprising:
   a stator core, the coils being wound around the stator core; and
   a routing member,
   wherein the routing member and the coils are lined up in an axial direction of the stator core, and
   wherein the routing member includes:
      a main body having a ring shape in a plan view of the stator unit, and having an outer circumference, and an inner circumference encircling an inner space,
      a plurality of concentric groove portions formed in the main body so as to be separated from one another in a radial direction of the main body, and having wires routed therein, the wires extending from the coils, and
      a plurality of guide slits, each of which is a cutout formed in the main body to penetrate the main body in an axial direction of the main body, and has one of the wires inserted therein that is led from one of the coils to one of the groove portions, each guide slit having an opening that opens into the inner space or into a space beyond the outer circumference, said each guide slit extending from the outer circumference or the inner circumference of the main body in the radial direction of the main body, and reaching the one of the groove portions so that the one of the wires is directly reachable from the inner space or the space beyond the outer circumference of the main body to the one of the groove portions via said each guide slit.

2. The stator unit according to claim 1, wherein the groove portions each comprise a locking recess located at a junction with each one of the plurality of guide slits and recessed in a circumferential direction.

3. The stator unit according to claim 1, wherein
the routing member further comprises a cover configured to cover the groove portions, and the cover comprises an opening configured to have the wires pulled out at one end in order to connect the wires routed in the groove portions.

4. The stator unit according to claim 1, wherein
the routing member further comprises a cover configured to cover the groove portions, and
the cover comprises a pressing protrusion configured to press the wires routed inside the groove portions.

5. The stator unit according to claim 1, wherein
the routing member further comprises a collection groove portion joined to the groove portions, and configured to have the wires routed in the groove portions collected at one end,
the collection groove portion comprises a plurality of guide walls arranged along a direction of extension of the collection groove portion, and
each wire is led from a corresponding one of the groove portions to an inside of the collection groove portion along a corresponding one of the plurality of guide walls.

6. The stator unit according to claim 5, wherein the guide walls are arranged so as to allow the wires to be lined up in a width direction of the collection groove portion at one end.

7. The stator unit according to claim 5, wherein junctions between each one of the plurality of guide walls and the groove portions are formed like arc surfaces.

8. A rotary electric machine, comprising:
the stator unit according to claim 1; and
a rotor.

9. A method of manufacturing a stator unit, comprising:
winding a plurality of wires around a stator core to form a plurality of coils;
pulling out ends of the wires of the coils;
mounting a routing member having the wires pulled out from the coils routed therein,
wherein the routing member and the coils are lined up in an axial direction of the stator core, and
wherein the routing member includes
a main body having a ring shape in a plan view of the stator unit,
a plurality of concentric groove portions formed in the main body so as to be separated from one another in a radial direction of the main body and having wires routed therein, and
a plurality of guide slits each of which is a cutout formed in the main body to penetrate the main body in an axial direction of the main body and has one of the wires that is led from one of the coils to one of the groove portions inserted therein, the main body having an outer circumference, and an inner circumference encircling an inner space, each guide slit having an opening that opens into the inner space or into a space beyond the outer circumference, said each guide slit extending from the outer circumference or the inner circumference of the main body in the radial direction of the main body, and reaching the one of the groove portions so that the one of the wires is directly reachable from the inner space or the space beyond the outer circumference of the main body to the one of the groove portions via said each guide slit; and
routing the wires pulled out from the coils in the groove portions, wherein,
in the routing, a first wire to be routed from among the wires, is routed in one of the groove portions located farthest from an outer circumference or an inner circumference of the routing member via one of the guide slits, and a last wire to be routed from among the wires, is routed in one of the groove portions located nearest to the outer circumference or the inner circumference of the routing member via an other one of the guide slits.

10. The method according to claim 9, wherein the routing includes leading each of the wires routed in the groove portions to an inside of a collection groove portion along a corresponding one of the plurality of guide walls, the collection groove portion being joined to the groove portions.

* * * * *